United States Patent
Fang et al.

(10) Patent No.: US 12,299,170 B2
(45) Date of Patent: *May 13, 2025

(54) SENSITIVE DATA MANAGEMENT SYSTEM

(71) Applicant: Capital One Services, LLC, McLean, VA (US)

(72) Inventors: Gerardo Fang, El Paso, TX (US); Nicholas Hermann, Rockledge, FL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,902

(22) Filed: Mar. 25, 2024

(65) Prior Publication Data

US 2024/0232429 A1    Jul. 11, 2024

Related U.S. Application Data

(63) Continuation of application No. 17/393,613, filed on Aug. 4, 2021, now Pat. No. 11,972,016.

(51) Int. Cl.
*G06F 21/62* (2013.01)
*H04W 12/02* (2009.01)

(52) U.S. Cl.
CPC ........ *G06F 21/6245* (2013.01); *H04W 12/02* (2013.01)

(58) Field of Classification Search
CPC .. G06F 21/6245; G06F 40/174; H04W 12/02; G06Q 40/03
See application file for complete search history.

(56) References Cited

U.S. PATENT DOCUMENTS

| | | | |
|---|---|---|---|
| 7,774,378 B2 * | 8/2010 | Nelson | G06F 16/958 717/101 |
| 8,639,615 B1 | 1/2014 | Neal | |
| 9,342,611 B2 | 5/2016 | Vellozo Luz et al. | |
| 9,639,515 B2 | 5/2017 | Inukonda et al. | |
| 9,710,657 B1 | 7/2017 | Kakkar et al. | |
| 9,805,014 B2 | 10/2017 | Ramakrishnan et al. | |

(Continued)

FOREIGN PATENT DOCUMENTS

| | | | | |
|---|---|---|---|---|
| CN | 115664668 A | | 1/2023 | |
| CN | 116595495 A | * | 8/2023 | ............. G06F 21/12 |

(Continued)

*Primary Examiner* — Christopher A Revak
(74) *Attorney, Agent, or Firm* — Sterne, Kessler, Goldstein & Fox P.L.L.C.

(57) ABSTRACT

Disclosed herein are various embodiments for a sensitive data management system. An embodiment operates by receiving a web form from a transaction account of a web application associated with a first user, the form indicating a request for sensitive information of a second user. A request for an authorization to release the sensitive information to the web application. The authorization from the second user to release the sensitive information to the transaction account associated with the first user is received. The web form is populated with the sensitive information of the second user responsive to receiving the authorization from the second user to release the sensitive information, and the populated form including the sensitive information of the second user is provided to the web application.

20 Claims, 4 Drawing Sheets

(56) References Cited

U.S. PATENT DOCUMENTS

| | | | |
|---|---|---|---|
| 10,474,838 B1 | 11/2019 | Edwards et al. | |
| 10,671,760 B2 | 6/2020 | Esmailzadeh et al. | |
| 11,113,415 B1* | 9/2021 | Amico | H04W 12/02 |
| 11,972,016 B2* | 4/2024 | Fang | G06Q 40/03 |
| 2010/0328225 A1* | 12/2010 | Black | G06Q 10/10 |
| | | | 726/16 |
| 2011/0238482 A1 | 9/2011 | Carney et al. | |
| 2011/0265187 A1 | 10/2011 | Li | |
| 2014/0108252 A1 | 4/2014 | Itwaru et al. | |
| 2016/0343076 A1 | 11/2016 | Kennedy et al. | |
| 2017/0337626 A1 | 11/2017 | Bryant et al. | |
| 2020/0082460 A1 | 3/2020 | Patidar et al. | |
| 2020/0380509 A1 | 12/2020 | Billman et al. | |
| 2020/0410023 A1* | 12/2020 | Hurst | G16H 10/60 |
| 2022/0309489 A1* | 9/2022 | Kahn | G06Q 20/367 |
| 2023/0038128 A1 | 2/2023 | Fang et al. | |
| 2023/0137378 A1 | 5/2023 | LaTerza et al. | |
| 2023/0342166 A1* | 10/2023 | DeNeui | G06F 9/451 |

FOREIGN PATENT DOCUMENTS

| | | | | |
|---|---|---|---|---|
| FR | 3114714 A1 * | 4/2022 | | H04L 9/32 |
| WO | 2020141890 A1 | 7/2020 | | |

* cited by examiner

SENSITIVE DATA MANAGEMENT SYSTEM

CROSS-REFERENCE TO RELATED APPLICATIONS

This application is a continuation of U.S. patent application Ser. No. 17/393,613 titled "Sensitive Data Management System", filed Aug. 4, 2021, which is herein incorporated by reference in its entirety.

BACKGROUND

For many organizations that collect data from and about their customers or clients, it is normal operating procedure for an organization to share its collected data with other organizations through partnerships. This data may include customer names, addresses, email addresses, phone numbers, transaction history with the organization (e.g., sales and payments), and interests (e.g., in various products or services). However, these data collecting and sharing organizations need to have more safeguards in place when collecting and/or sharing more sensitive customer information, such as a social security number, date of birth, or financial data.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, that protect sensitive data For many organizations that collect data from and about their customers or clients, it is normal operating procedure for an organization to share its collected data with other organizations through partnerships. This data may include customer names, addresses, email addresses, phone numbers, transaction history with the organization (e.g., sales and payments), and interests (e.g., in various products or services). However, these data collecting and sharing organizations need to have more safeguards in place when collecting and/or sharing more sensitive customer information, such as a social security number, date of birth, or financial data. In some circumstances, there may be privacy laws that prevent the sharing of such sensitive information of a customer without explicit and timely customer consent.

Figure 1:
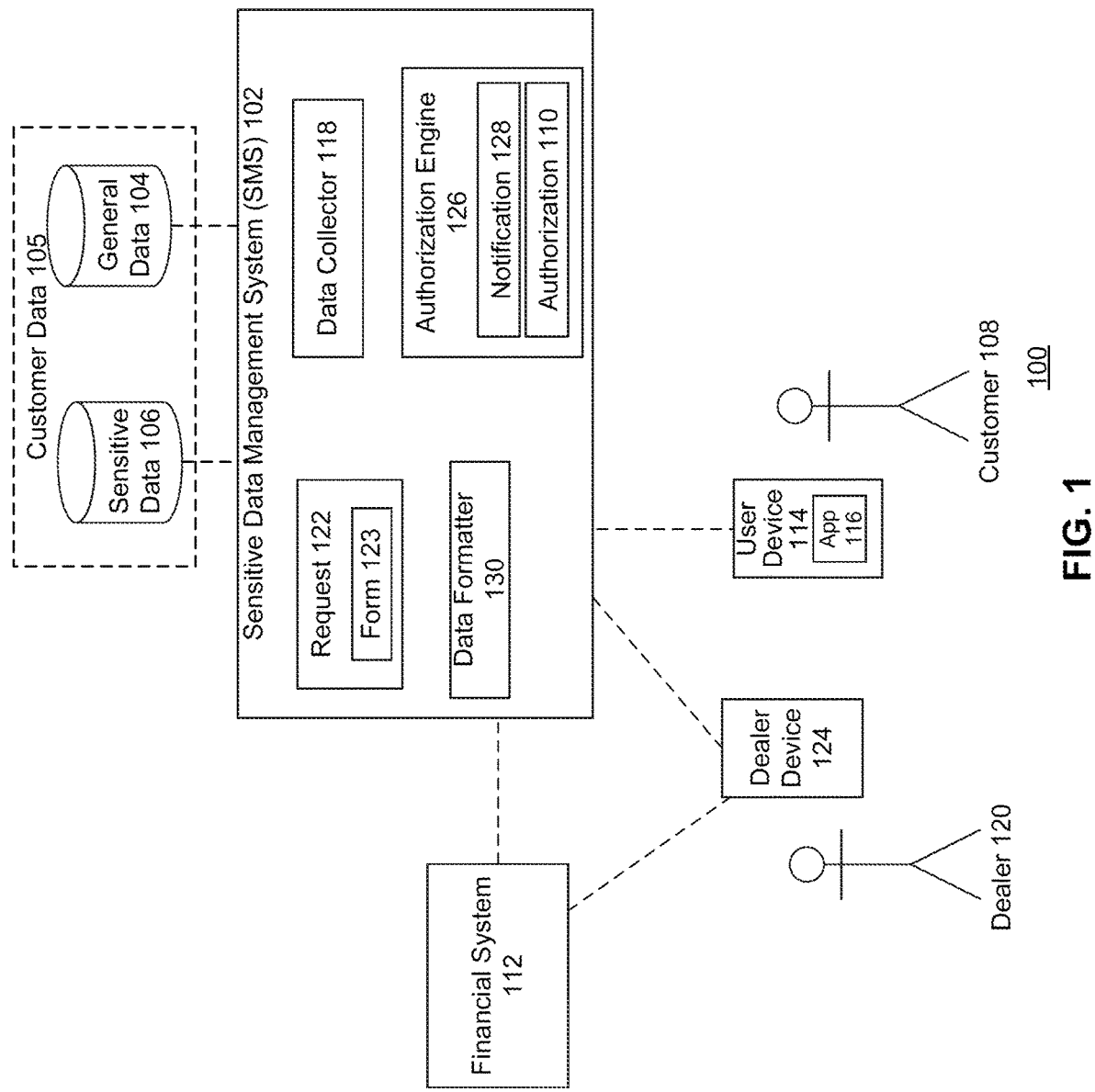
FIG. 1 is a block diagram of a system for providing a sensitive data management system (SMS), according to some embodiments.

FIG. 1 is a block diagram 100 of a sensitive data management system (SMS) 102, according to some embodiments. SMS 102 may collect or receive information about a customer 108. This information may include a wide array of information such as name, email address, phone number, address, social security number, date of birth, gender, interests, browsing history, and financial data, etc. The financial data may include credit scores, payment histories, purchase histories, income, tax return information, property or vehicle ownership, stock ownership, or interests in other financial assets. This customer information may be stored as either sensitive data 106 or general data 104, generally referred together as data 105 or customer data 105.

The general data 104 and sensitive data 106 may be collected by a data collector 118 and stored across one or more databases or other storage systems as customer data 105. The data collector 118 may receive data directly from a customer 108, from public records such as land and state records, or other data sources. In some embodiments, customer 108 may have applied for a loan or credit card with a financial organization associated with the data collector 118, and the data collector 118 may gather and store information about the previous customer transactions with the financial organization as customer data 105.

In some embodiments, SMS 102 may provide or make available customer data 105 to one or more other systems, such as financial system 112 to perform actions with or on behalf of customer 108. However, prior to initiating a data transfer, particularly of sensitive data 106, SMS 102 may first request and receive an authorization 110 from customer 108 regarding the intended use of the sensitive data 106. SMS 102 may ensure that a customer 108 has control over when and to whom their customer data 105 is shared, thus further ensuring their privacy and information security.

SMS 102 may also expedite and make it easier for customer 108 to enter into new business relationships or conduct new business transactions (such as requesting lines of credit, loan applications, credit card applications, etc.) with one or more financial institutions by making the customer data 105 directly available to financial system 112. This direct transfer of customer data 105 by SMS 102 to financial system 112 may save both time and resources that may otherwise be required for financial system 112 to collect the required data from customer 108 directly or other sources, and may increase the confidence that the transferred customer data 105 is accurate and valid, thus increasing the likelihood of success of future business or financial transactions.

In some embodiments, a customer 108 may use their user device 114 to search for cars online. User device 114 may include a mobile phone, laptop, tablet, or other SMART or internet of things (IoT) device. In some embodiments, the customer 108 may perform internet searches or may use an app 116 to perform some functionality. In some embodiments, the customer 108 may be logged in to an account on the app 116, which may be accessible from any different number or types of user devices 114.

In some embodiments, the app 116 may be an application or program, including a webpage or browser plugin, accessible from the user device 114 through which customer 108 may perform searches for cars, houses, other items for purchase. App 116 may enable the customer 108 to request quotes, locate dealers, negotiate prices, apply for loans, etc. Searching for cars is only one example use of app 116, in other embodiments, app 116 may have a wide variety of uses other than searching for cars.

In some embodiments, to perform the requested functionality, app 116 may request information from customer 108. For example, in the car search example, the customer 108 may need to enter what features they are looking for in a car (e.g., make, model, year, color, mileage, horsepower, guidance or other audio or video systems in the car, etc.), their geographic area of interest, and their price range. This may be enough to perform a simple search for available cars to purchase.

However, the customer 108 may also need or be looking for an auto loan with which to purchase or finance the car. It is understood that requesting an auto loan quote may require additional information beyond what was provided for a simple car search. Such, auto loan information may include name, address, city, state, income, occupation, social security number, loan amount, down payment, maximum payment, etc.

In some embodiments, the information input by customer 108 into app 116 may be received by a data collector 118. In the car example above, the information may include both car search data 104 and loan request data 106. In some embodiments, data collector 118 may request and/or receive information about customer 108 both through app 116 and one or more other websites or other web services. This information from other sources may include previous browsing history, advertisements that were displayed to user device 114, and/or transactions (e.g. sales, payments, or other financial transactions or information requests) with a particular company or organization. In some embodiments, information about customer 108 may be tracked or accumulated based on an internet protocol (IP) address or media access control (MAC) address of user device 116, or an account such as an email address or phone number, or a userid for app 116.

In continuing the car purchasing example above, customer 108 may negotiate for a particular vehicle with a dealer 120. Dealer 120 may be any individual or representative of an organization that is performing a financial transaction with or on behalf of customer 108. In an embodiment, if customer 108 wants to inquire about various financing or leasing options for a vehicle, dealer 120 may need to request various information from customer 108. The requested information may include both general data 104 and sensitive data 106. In some embodiments, customer 108 may share this information with the dealer 120 in person face-to-face in a dealership, online through app 116, or even on the telephone.

In an embodiment, general data 104 may be any data that is publicly available or accessible through online searches or public databases. Example general data 104 may include name, address, real property holdings, gender, age, and phone number. Sensitive data 106 may be any information that is not publicly accessible or that was intentionally marked by customer 108 as being sensitive. Example sensitive data 106 may include income, employer, social security number, date of birth, marital status, health information, and credit score. In some embodiments, when data collector 118 stores new information about customer 108, customer 108 may be informed and may mark the information as sensitive or general.

Traditionally a car dealer asks a customer to provide all the required information either verbally or in written form. The dealer or sales representative would then have to manually input the received information into a computer to determine the financing options that may be available to the customer. This manual process is both time consuming and subject to human error by both the customer and the dealer. SMS 102 expedites and simplifies the process of populating customer data 105, including both general data 104 and sensitive data 106, into a financial system 112, while protecting the customer 108.

In some embodiments, if customer 108 walks into a dealership and inquires about financing options on a new or used vehicle, dealer 120 may submit a request 122 for customer data 105 from SMS 102 from dealer device 124. Dealer device 124 may be a computing device at the dealership that dealer 120 uses to communicate with a financial system 112.

In some embodiments, request 122 may include a form 123. Form 123 may include a web form or template where customer data 105 is to be populated in a format that is compatible with financial system 112 and/or the interface of dealer device 124. In some embodiments, request 122 may include multiple forms, such as a first form 123 for general data 104 and a second form 123 form sensitive data 106. In an embodiment, a form 123 that is populated with sensitive data 106 may be encrypted at a higher level of encryption relative to a form 123 that is populated with only general data 104.

Upon receiving request 112, an authorization engine 126 may populate form 123 with general data 104 (e.g., any information not subject to customer authorization) and may generate a notification 128 requesting an authorization 110 to release sensitive data 106. In some embodiments, SMS 102 may provide form 123 with general data 104 to dealer device 124 and/or financial system 112 prior to receiving user authorization 110 for the release of sensitive data 106.

The notification 128 to customer 108 requesting authorization may include any information that may be useful to customer 108 in determining whether or not to release sensitive data 106. In an embodiment, the notification 128 may indicate from whom (organization and person, e.g., dealer 120) request 122 was received, a date/time of request 122, what specific information or sensitive data 106 is requested (e.g., social security number, date of birth, credit score, or income), and whether the dealer 120 or requestor is a trusted, verified, or registered source. In some embodiments, SMS 102 may maintain or have access to a list of trusted requesters or registered dealers 108 who are known to be legitimate or who have partnerships with SMS 102.

Customer 108 may receive notification 128 as a message through app 114, as a text message, as an email message, and/or as an automated phone call on user device 114. Customer 108 may then authorize whether or not to release sensitive data 106. In an embodiment, customer 108 may release pieces of sensitive data 106 and may choose not to release other sensitive data 106. In some embodiments, customer 108 may need to provide a security code or verification code, such as the last four digits of customer's social security number for authorization 110.

Authorization 110 may be a full authorization, releasing all requested sensitive data 106, or authorization 110 may include a partial authorization allowing the release of some portion of sensitive data 106, but not other data. For example, customer 108 may authorize the release of their credit scores but not social security number. Dealer 120 may then need to request the social security number directly from customer 108 and enter it manually. In some embodiments, customer 108 may reject or deny the request 122, in which case no sensitive data 106 may be released.

Upon receiving authorization 110, SMS 102 may populate form 123 with general data 104 and/or sensitive data 106. In some embodiments, a data formatter 130 may format the sensitive data 106 (and/or general data 104) prior to populating form 123. The change in format may include a change in data type (e.g., String to integer), a change in structure (e.g., date values may be changed from YYYY/MM/DD to DD/MM/YYYY), or even a change in value (e.g., a purchase price may be rounded up or down to the nearest dollar or hundred dollar value). In other embodiments, data formatter 130 may be configured to perform other transformations on customer data 105 before or while populating form 123.

In some embodiments, customer 108 may request (through authorization 110) that portions of customer data 105, sensitive data 106 and/or general data 104, is not made accessible to dealer 120. For example, notification 128 may be a web form with a check box next to different data that the customer 108 may choose to hide from dealer 120.

In some embodiments, data formatter 130 may provide any requested information, or portions thereof, directly to financial system 112 without making it accessible or viewable on dealer device 124. This increases overall system throughput and uses less bandwidth while providing an extra layer of security for the information of customer 108 (which may include customer data 105, sensitive data 106, and general data 104). For example, rather than providing the requested information to dealer device 124, where it may be accessed, copied, or manipulated, and then requiring the dealer 120 to submit the information to financial system 112, which requires additional resources and bandwidth, SMS 102 may directly provide the information to financial system 112.

In some embodiments, financial system 112 may confirm its receipt of information from SMS 102 by updating web form 123 to indicate that the information is no longer required, or has been received. For example, the social security number field may be removed from web form 123, or greyed out indicating the information has been received and is no longer needed from customer 108. The updated web form 123 may indicate what other information is needed to complete the transaction.

Though described herein as a financial system 112, in some embodiments, financial system 112 may be any network or Internet accessible web application that may be operating across one or more servers. For example, financial system 112 may be an online marketplace where users can sell/purchase goods. Dealer 120 may be assisting customer 108 with the purchase or sale of goods using an account to which dealer 120 is logged in from dealer device 124. Rather than providing customer data 105 to dealer device 124 or otherwise making the customer data 105 accessible to the dealer's account, SMS 102 may directly provide the customer data 105 to the online marketplace or other web application (e.g., financial system 112), which would save the bandwidth required for multiple transfers of customer data 105 as well as ensuring the data security and integrity of customer data 105.

The populated web form may not be accessible from dealer device 124, however any unpopulated fields (e.g., fields for which information is missing or that need verification) may be made accessible to the dealer account or otherwise transmit to dealer device 124.

In some embodiments, data formatter may provide data to dealer device 124 but may obscure or make not visible the indicated portions of sensitive data 106. This may enable customer 108 to release sensitive data 106 to dealer 120 without fear of exposing the sensitive data 106 to dealer 120, thus increasing data security, particularly while the data in transit.

In some embodiments, SMS 102 may also maintain a log or record of data requests 122 and authorizations 110. This may enable a customer 108 to access or view a data release history of to which dealers 120 or other organizations their customer data 105 was released, which customer data 105 was released or denied release, and when the customer data 105 was released. The populated form 123 may then be provided directly to financial system 112 or dealer device 124. When providing the dealer device 124, the customer 108 may have the opportunity to verify the accuracy of the data prior to submission to financial system 112.

Figure 2:
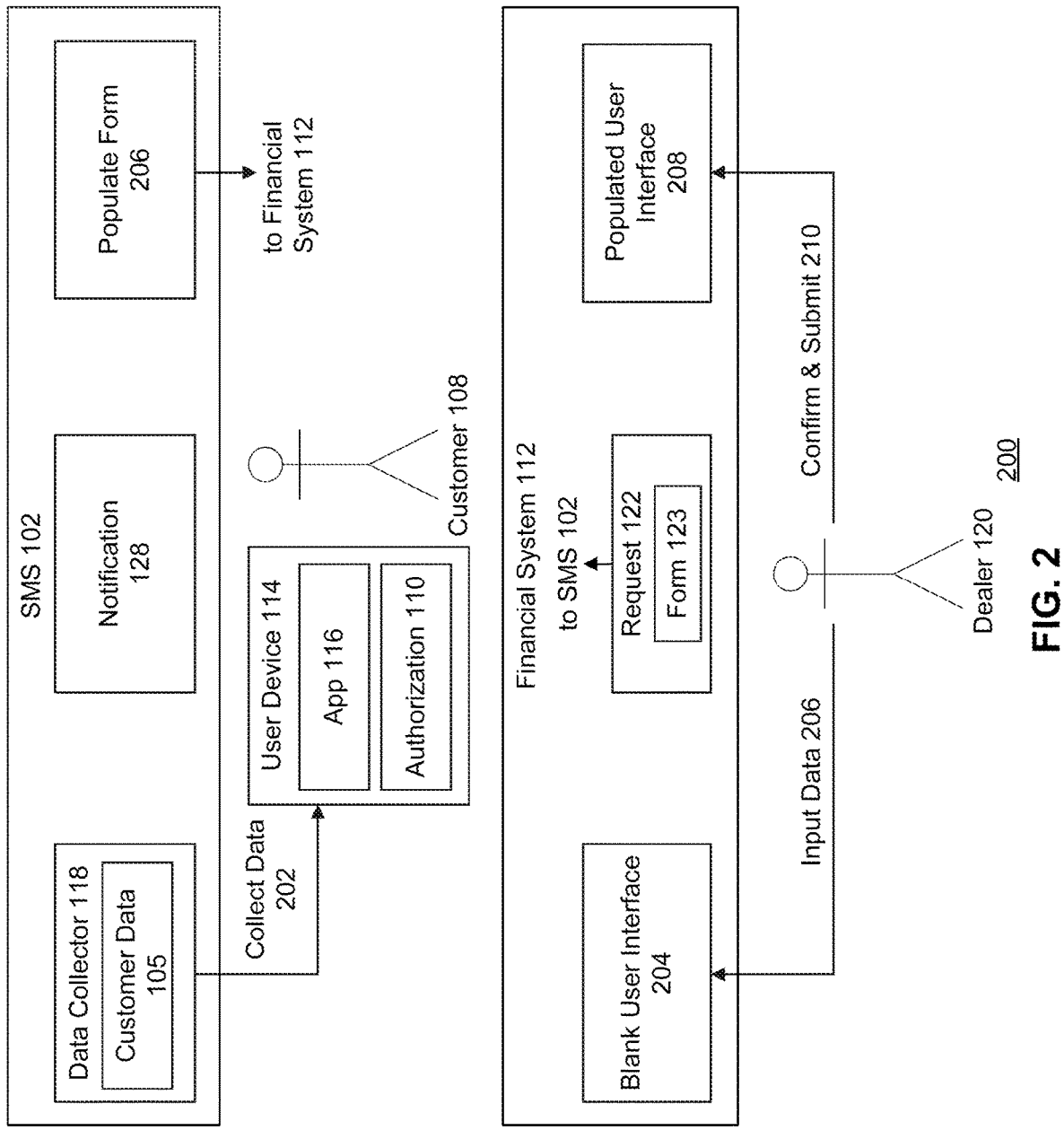
FIG. 2 is another block/flow diagram illustrating example functionality of a sensitive data management system (SMS), according to some additional embodiments.

FIG. 2 is a block/flow diagram 200 of a sensitive data management system (SMS) 102, according to some additional embodiments. In some embodiments, a customer 108 may contact the dealer 120 regarding performing a financial transaction, such as opening a bank account, requesting a credit card or credit line, or applying for a loan. The dealer 120 may begin the process by logging in to financial system 112, using their personal credentials (e.g., User ID and password). Dealer 120 may need particular information about the customer 108 to process the customer's request, and may need to enter this information into financial system 112. Financial system 112 may include any computing system that is organized or configured to receive and process data about a customer 108 as part of a financial transaction.

The dealer 120 may manually ask the customer 108 to provide the requested information, by writing it down or speaking it verbally, and then the dealer 120 may need to enter this information into financial system 112. However, there are a number of issues that arise with this scenario. The customer 108 may not remember or have all the information requested, the customer 108 may accidentally or purposefully provide incorrect information to the dealer 120, the dealer 120 may incorrectly input the information into financial system 112, and this manual process is time consuming for both customer 108 and dealer 120. There may also be security concerns in the customer 108 providing sensitive information to a representative of the dealer 120. For example, the customer 108 may not trust the dealer 120 with sensitive information.

Rather than relying on this manual process, SMS 102 may provide an auto-fill option that protects the sensitive data of customer 108, while allowing the transaction to proceed with greater security and less time. For example, SMS 102 may transfer or make available customer data 105, as may have already been collected by data collector 118.

At 202, data collector 118 may have been operating to collect data from and about customer 108 while customer 108 is performing other computing activities. For example, data collector 118 may collect data while customer 108 is using app 116 on their mobile phone or user device 114. Data collector 118 may collect data when customer is browsing or searching the Internet or when the customer 108 applies for other loans or performs other transactions through any different number of financial systems 112 or banks. Data collector 118 may already include or have assembled a repository of customer data 105. The data collection process 202 may be performed as a background process and may not require particular user intervention or action.

At 204, dealer 120 may log in to financial system and may be presented with a blank user interface 204. The blank user interface 204 may request particular identifying information about customer 108. The requested information may include name, last four digits of a social security number, date of birth, city of residence, phone number, email address, etc.

At 206, dealer 120 may provide the requested identifying information to financial system 112 about customer 108. In some other embodiments, customer 108 may provide this information to financial system 112 through their own user device 114, such as by responding to an email or message requesting identifying information, or by directly inputting the information on a dealer device 124 or terminal connected to financial system 112.

Upon receiving requisite identifying information, financial system 112 may generate a request 122 for customer data 105 about the identified customer 108. In some embodiments, this request 122 may include a form 123 that indicates which customer data 105 is requested. The request 122 and form 123 may be transmitted to SMS 102 over a communications link. In some embodiments, different financial systems 112 may request different information from SMS 102 which may be requested through different forms 123.

Form 123 may indicate what information is being requested and/or a format of any requested data. In some embodiments, form 123 may be a web form, spreadsheet, or other document that is to be filled in or populated by SMS 102 with the requested information.

SMS 102 may receive the request 122, and form 123, and may provide a notification 128 to customer 108 requesting authorization 110. The notification 128 may indicate what information is being requested, who is requesting it, the time of the request, an expiration time by which to provide the authorization 110, and any other relevant information. In some embodiments, notification 128 may include the capability for a customer 108 to select to release certain portions of data while not releasing other data.

If SMS 102 does not receive authorization 110 by the expiration time, then either a new notification 128 is provided to the same device or account or may be provided to a different device or account associated with the user or customer 108, or the response is marked as being denied, and no information is released.

At 206, SMS 102 may have received authorization 110 and populated the received form 123. For example, SMS 102 may fill in the requested information from form 123 with customer data 105, including both sensitive data 105 and general data 104. The populated form 123 may be encrypted and transmitted to financial system 112. At 208, the financial system 112 may indicate that the form 123 has been populated.

In some embodiments, through authorization 110, customer 108 may indicate a level of security for their customer data 105, particularly their sensitive data 106. A low level of security may transmit and make all the customer data viewable to dealer 120. A medium level of security may obscure some portions of data from view by dealer 120 while allowing other data visible. A highest level of security may obscure all the customer data 105 transmit to financial system 112 so that it is not viewable by dealer 120.

In some embodiments, at 210, the dealer 120 may be able to see on the interface of financial system 112 that the social security number field is filled in, but for security purposes to protect sensitive data 106, the populated social security number value may be obscured. For example, instead of seeing the social number 123-45-6789, the dealer may see \*\*\*-\*\*-\*\*\*\*. Or for example, the sensitive data may be partially visible. However, on the interface, the field may be marked as completed if received from SMS 102.

At 210 the dealer 120 may be requested to fill in any information not available from customer data 105 or otherwise not authorized for release by customer 108. In some embodiments, with lower security, at 210, the populated information received may be made visible on an interface for dealer 108 so that customer 108 and/or dealer 120 may review and confirm that the information appears correct. The dealer may confirm and submit the request to financial system 112 to proceed with the financial transaction.

Figure 3:
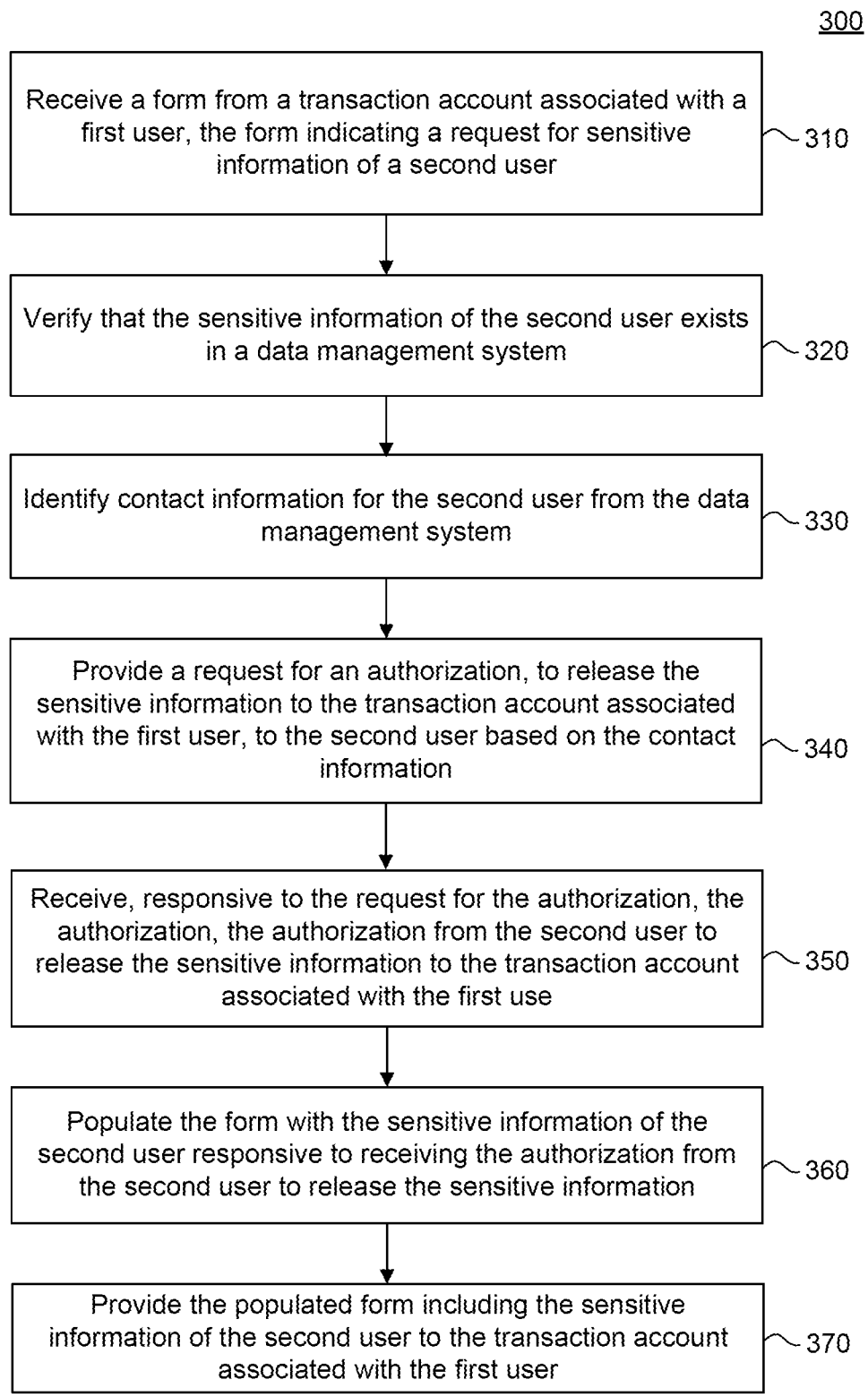
FIG. 3 is a flowchart illustrating example operations of a sensitive data management system (SMS), according to some embodiments.

FIG. 3 is a flowchart 300 illustrating example operations of a sensitive data management system (SMS) 102, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Without limiting method 300, method 300 is described with reference to elements in FIG. 1.

At 310, a form is received from a transaction account associated with a first user, the form indicating a request for sensitive information of a second user. For example, SMS 102 may receive a form 123 from a transaction account or dealer device 124 of dealer 120. The transaction account may include a login/password or account that dealer 120 has with financial system 112, and that is accessible through dealer device 124. For example, each sales representative of an organization may have their own login/password or transaction account though which they can fill in or request customer data 105. In some embodiments, dealer 120 may be performing a financial transaction on behalf of the second user through the account, such as applying for a loan or credit card.

At 320, it is verified that the sensitive information of the second user exists in a data management system. For example, upon receiving request 122 with form 123, SMS 102 may verify that the requested information exists in customer data 105. If customer data 105 only includes a portion of the requested information, then SMS 102 may proceed with requesting authorization as described 110 below and the non-existent information may be left blank or otherwise marked as non-existent when returning the populated form.

At 330, contact information for the second user is identified from the data management system. For example, customer data 105 may include contact information for customer 108. The contact information may include an email address, user id for app 116, social media handles, phone number, IP address or MAC address of user device 114, or other contact information.

At 340, a request for authorization to release the sensitive information to the transaction account associated with the first user is provided to the second user based on the contact information. For example, SMS 102 may transmit a text message with notification 128 requesting authorization 110 to release sensitive data 106 of customer 108 to a phone number associated with user device 114 which is known or verified to be associated with customer 108. Or, for example, SMS 102 may send notification 128 via email or through app 116.

At 350, the authorization is received from the second user to release the sensitive information to the transaction account associated with the first user. For example, authorization engine 126 may receive the authorization 110 from customer 108. In some embodiments, authorization engine 126 may require the customer 108 to confirm a portion of customer data 105 to validate the customer 108 and authorize the release of customer data 105. For example, customer 108 may be required to provide their zip code or the last four digits of their social security number. Authorization engine 126 may verify whether the authorizing data, such as the last four digits of the social security number of user, matches customer data 105. Authorization engine 126 may also indicate what data 105 is to be released or used to populate form 123.

At 360, the form is populated with the sensitive information of the second user responsive to receiving the authorization from the second user to release the sensitive information. For example, SMS 102 may populate form 123 with customer data 105.

At 370, the populated form including the sensitive information of the second user is provided to the transaction account associated with the first user. For example, the populated form 123 may be returned to financial system 112.

Figure 4:
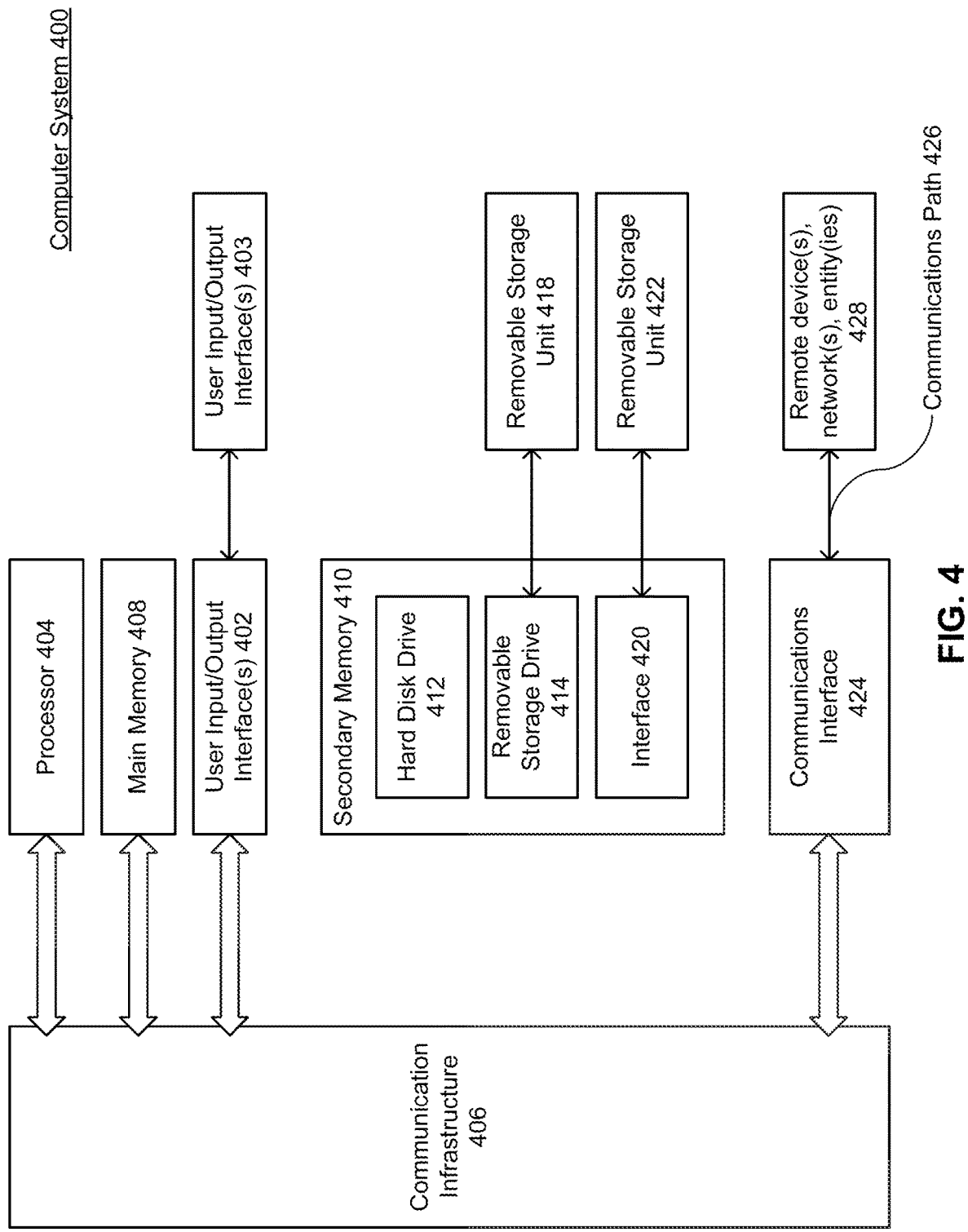
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   receiving, from a first user, a request for sensitive information of a second user, wherein the sensitive information is stored by a data management system;
   identifying, by one or more processors, contact information for the second user from the data management system;
   providing, by the one or more processors, an electronic request for an authorization to the second user based on the contact information, wherein the electronic request for the authorization requests permission to release the sensitive information, wherein the providing the electronic request for the authorization is performed subsequent to receiving the request for the sensitive information;
   receiving, responsive to the electronic request for the authorization, an authorization from the second user to release the sensitive information; and
   populating a web form, associated with the request for the sensitive information, with the sensitive information responsive to receiving the authorization from the second user to release the sensitive information.

2. The method of claim 1, wherein the sensitive information comprises a social security number and birthdate of the second user.

3. The method of claim 1, wherein the authorization is associated with releasing the sensitive information as part of a loan prequalification transaction.

4. The method of claim 3, wherein the populating comprises:
   identifying a format for the sensitive information from the web form;
   reformatting at least a portion of the sensitive information in accordance with the format associated with the web form; and
   populating the web form with the reformatted portion of the sensitive information.

5. The method of claim 1, further comprising:
   identifying non-sensitive information associated with the second user associated with the web form; and
   populating the web form with the non-sensitive information prior to receiving the authorization to release the sensitive information.

6. The method of claim 1, wherein the providing the electronic request for the authorization comprises:
   transmitting the electronic request for the authorization to a user device identified by the contact information and associated with the second user.

7. The method of claim 6, wherein the providing the electronic request for the authorization comprises:
   determining that the user device has an app associated with sensitive information installed on the user device, wherein the sensitive information installed on the user device was received through the app; and
   transmitting the electronic request for the authorization to the user device via the app.

8. The method of claim 1, wherein the authorization to release the sensitive information comprises a code associated with the second user.

9. The method of claim 8, wherein the code comprises a portion of a social security number of the second user.

10. A system comprising:
    a memory; and
    at least one processor coupled to the memory and configured to perform operations comprising:
       receiving, from a first user, a request for sensitive information of a second user, wherein the sensitive information is stored by a data management system;
       identifying contact information for the second user from the data management system;
       providing an electronic request for an authorization to the second user based on the contact information, wherein the electronic request for the authorization requests permission to release the sensitive information, wherein the providing the electronic request for the authorization is performed subsequent to receiving the request for the sensitive information;

receiving, responsive to the electronic request for the authorization, an authorization from the second user to release the sensitive information; and populating a web form, associated with the request for the sensitive information, with the sensitive information responsive to receiving the authorization from the second user to release the sensitive information.

11. The system of claim 10, wherein the sensitive information comprises a social security number and birthdate of the second user.

12. The system of claim 10, wherein the authorization is associated with releasing the sensitive information as part of a loan prequalification transaction.

13. The system of claim 12, wherein the populating comprises:

identifying a format for the sensitive information from the web form;

reformatting at least a portion of the sensitive information in accordance with the format associated with the web form; and populating the web form with the reformatted portion of the sensitive information.

14. The system of claim 10, the operations further comprising:

identifying non-sensitive information associated with the second user associated with the web form; and populating the web form with the non-sensitive information prior to receiving the authorization to release the sensitive information.

15. The system of claim 10, wherein the providing the electronic request for the authorization comprises:

transmitting the electronic request for the authorization to a user device identified by the contact information and associated with the second user.

16. The system of claim 15, wherein the providing the electronic request for the authorization comprises:

determining that the user device has an app associated with sensitive information installed on the user device, wherein the sensitive information installed on the device was received through the app; and transmitting the electronic request for the authorization to the user device via the app.

17. The system of claim 10, wherein the authorization to release the sensitive information comprises a code associated with the second user.

18. The system of claim 17, wherein the code comprises a portion of a social security number of the second user.

19. A non-transitory computer-readable medium having instructions stored thereon that, when executed by at least one computing device, cause the at least one computing device to perform operations comprising:

receiving, from a first user, a request for sensitive information of a second user, wherein the sensitive information is stored by a data management system;

identifying contact information for the second user from the data management system;

providing an electronic request for an authorization to the second user based on the contact information, wherein the electronic request for the authorization requests permission to release the sensitive information, wherein the providing the electronic request for the authorization is performed subsequent to receiving the request for the sensitive information;

receiving, responsive to the electronic request for the authorization, an authorization from the second user to release the sensitive information; and populating a web form, associated with the request for the sensitive information, with the sensitive information responsive to receiving the authorization from the second user to release the sensitive information.

20. The non-transitory computer-readable medium of claim 19, wherein the sensitive information comprises a social security number and birthdate of the second user, and wherein the authorization from the second user comprises at least a portion of one of the social security number or birthdate of the second user.

* * * * *